US012500376B1

(12) United States Patent
Jagadeesan et al.

(10) Patent No.: US 12,500,376 B1
(45) Date of Patent: Dec. 16, 2025

(54) APPARATUS, SYSTEM, AND METHOD FOR SECURING MALE AND FEMALE CONNECTORS TOGETHER WITHOUT POSITIVE LOCKS

(71) Applicant: Juniper Networks, Inc., Sunnyvale, CA (US)

(72) Inventors: Raveen Jagadeesan, Bangalore (IN); Senthil Kumar Ramaswamy Venkat, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 308 days.

(21) Appl. No.: 18/317,858

(22) Filed: May 15, 2023

(51) Int. Cl.
*H01R 13/627* (2006.01)
*H01R 12/72* (2011.01)
*H01R 12/75* (2011.01)
*H01R 13/502* (2006.01)

(52) U.S. Cl.
CPC ....... *H01R 13/6271* (2013.01); *H01R 12/722* (2013.01); *H01R 12/75* (2013.01); *H01R 13/502* (2013.01)

(58) Field of Classification Search
CPC .. H01R 13/6271; H01R 12/722; H01R 12/75; H01R 13/502
See application file for complete search history.

(56) References Cited

U.S. PATENT DOCUMENTS 6,068,502 A * 5/2000 Kuo .................. H01R 12/7023 439/353
9,293,848 B2 * 3/2016 Zantout .............. H01R 12/7029
11,785,731 B1 * 10/2023 Morgan ............... H05K 5/0026 174/545
2024/0047907 A1 * 2/2024 Champion ....... H01R 13/65914

* cited by examiner

*Primary Examiner* — Edwin A. Leon
(74) *Attorney, Agent, or Firm* — Greenberg Traurig, LLP

(57) ABSTRACT

A disclosed clamp for securing male and female connectors together may include a spine, at least one arm that extends from a side of the spine, and at least one additional arm that extends from an additional side of the spine. In this example, the arm and the additional arm may be configured to collectively secure the spine against a cable-side connector coupled to a board-side connector to prevent the cable-side connector from decoupling from the board-side connector. Various other apparatuses, systems, and methods are also disclosed.

19 Claims, 7 Drawing Sheets

APPARATUS, SYSTEM, AND METHOD FOR SECURING MALE AND FEMALE CONNECTORS TOGETHER WITHOUT POSITIVE LOCKS

BACKGROUND

Computing devices often undergo unintentional jolts, bumps, and/or drops. These events may have the potential to decouple and/or undo certain electrical connections that are necessary to support the functionality of such devices. To protect against this possibility, computing equipment manufacturers may select connectors with positive locks (e.g., built-in locks) to establish, maintain, and/or ensure electrical continuity between different features in computing devices. For example, computing equipment manufacturers may design, assemble, and/or produce computing devices that incorporate cable connectors with built-in locking mechanisms. By doing so, these manufacturers may attempt to protect against the possibility of such cable connectors decoupling from one another and/or becoming undone.

Unfortunately, connectors with positive locks may have shortcomings and/or deficiencies in certain contexts and/or projects. For example, some connectors with positive locks may be expensive and/or costly relative to others without positive locks. Additionally or alternatively, some connectors with positive locks may consume and/or occupy significantly more board space and/or real estate than others without positive locks.

The instant disclosure, therefore, identifies and addresses a need for additional and/or improved apparatuses, systems, and methods for securing certain connectors together without positive locks.

SUMMARY

As will be described in greater detail below, the instant disclosure generally relates to apparatuses, systems, and methods for securing male and female connectors together without positive locks. In one example, a clamp for accomplishing such a task may include a spine, at least one arm that extends from a side of the spine, and at least one additional arm that extends from an additional side of the spine. In this example, the arm and the additional arm may be configured to collectively secure the spine against a cable-side connector coupled to a board-side connector to prevent the cable-side connector from decoupling from the board-side connector.

Similarly, a system capable of securing male and female connectors together without positive locks may include a board-side connector coupled to a circuit board, a cable-side connector installed in the board-side connector, and a clamp that prevents the cable-side connector from decoupling from the board-side connector. In one example, the clamp may include a spine, at least one arm that extends from a side of the spine, and at least one additional arm that extends from an additional side of the spine. In this example, the arm and the additional arm may be configured to collectively secure the spine against a cable-side connector coupled to a board-side connector to prevent the cable-side connector from decoupling from the board-side connector.

A corresponding method may include coupling a board-side connector to a circuit board, installing a cable-side connector in the board-side connector, and securing the cable-side connector to the board-side connector via a clamp that comprises a spine, at least one arm that extends from a side of the spine, and at least one additional arm that extends from an additional side of the spine.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
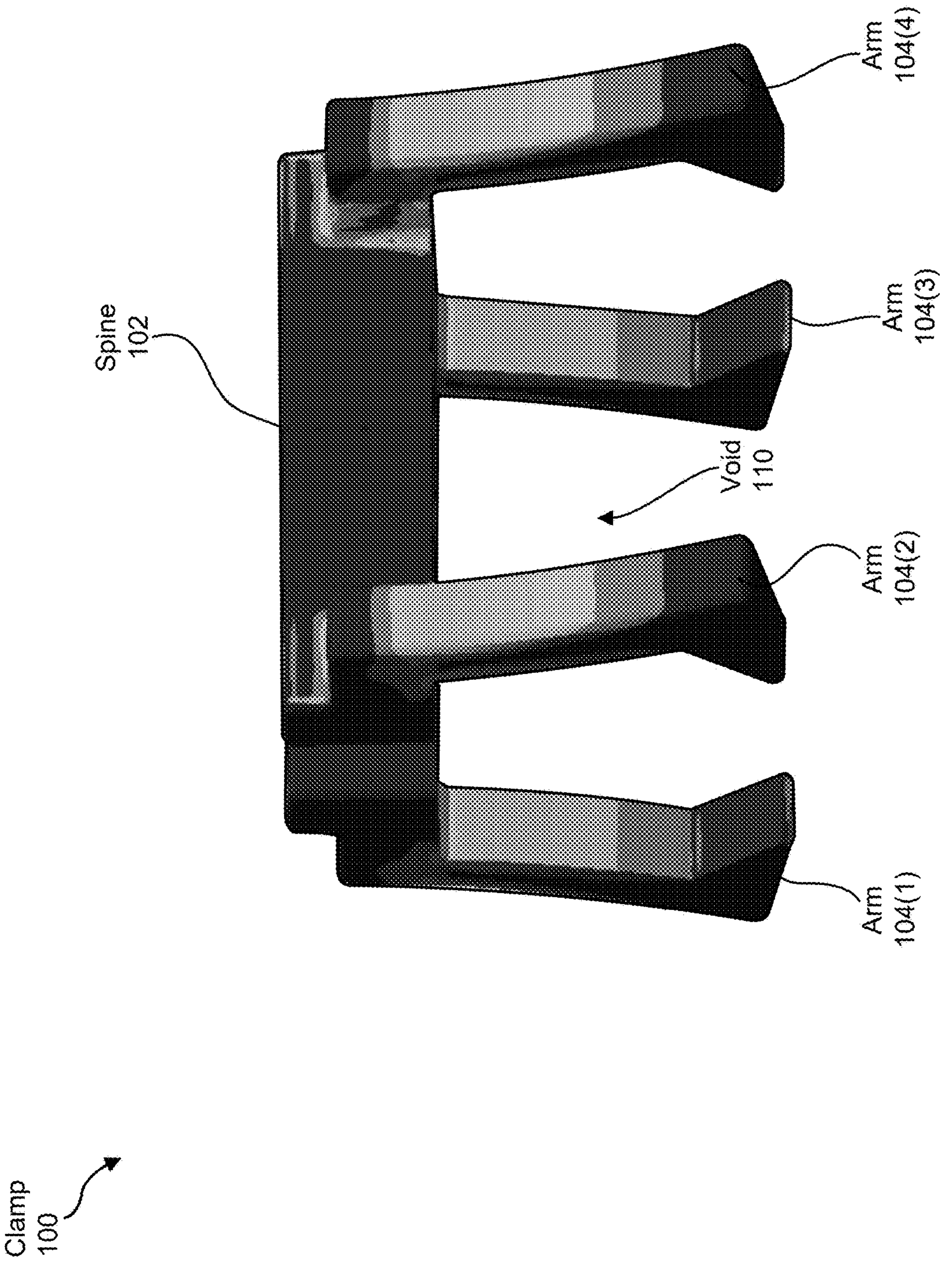
FIG. 1 is an illustration of an exemplary clamp capable of securing male and female connectors together in accordance with one or more embodiments of this disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various apparatuses, systems, and methods for securing male and female connectors together without positive locks. As will be explained in greater detail below, embodiments of the present disclosure may involve implementing and/or utilizing standalone clamps to secure cable connectors without positive locks. For example, a male cable connector coupled to a ribbon cable may be inserted and/or installed into a female cable connector coupled to a circuit board. In this example, after the insertion and/or installation of the male cable connector, an independent clamp may be applied and/or installed atop the male cable connector and/or the female cable connector.

In some examples, the clamp may interface with and/or press against the male cable connector inserted and/or installed into the female cable connector. Additionally or alternatively, the clamp may embrace and/or hug the male cable connector and/or the female cable connector, thereby holding and/or squeezing them together and/or in place relative to one another. By doing so, the clamp may prevent and/or stop the male cable connector from decoupling from the female cable connector. In this way, the clamp may be able to ensure, or at least improve the likelihood of maintaining, electrical continuity between the ribbon cable and the circuit board even if they experience and/or undergo certain jolts, bumps, and/or drops.

In some examples, the clamp and the cable connectors without positive locks may be significantly more affordable and/or less costly than similar and/or counterpart cable connectors with positive locks. Accordingly, the clamp and the cable connectors without positive locks may collectively provide the same functionality and/or benefits as similar and/or counterpart cable connectors with positive locks while avoiding the increased expense and/or costs. Additionally or alternatively, the clamp and the cable connectors without positive locks may consume and/or occupy significantly less board space and/or real estate than similar and/or counterpart cable connectors with positive locks. Accordingly, the clamp and the cable connectors without positive locks may collectively provide the same functionality and/or benefits as similar and/or counterpart cable connectors with positive locks despite having a significantly smaller footprint and/or board-space requirement.

The following will provide, with reference to FIGS. 1-6, detailed descriptions of exemplary apparatuses, devices, systems, and corresponding implementations for securing male and female connectors together without positive locks. Detailed descriptions of an exemplary method for securing male and female connectors together without positive locks will be provided in connection with FIG. 7.

FIG. 1 illustrates an exemplary clamp 100 capable of securing male and female connectors together without positive locks. As illustrated in FIG. 1, exemplary clamp 100 may include and/or represent a spine 102 and/or arms 104(1), 104(2), 104(3), and 104(4). In some examples, arms 104(1) and 104(3) may extend and/or project from a side of spine 102. In one example, arms 104(2) and 104(4) may extend and/or project from another side of spine 102. In this example, arms 104(1)-(4) may collectively form, establish, and/or provide a void 110 dimensioned to accommodate, embrace, and/or hug mated cable connectors (not necessarily illustrated and/or labelled in FIG. 1).

In some examples, clamp 100 may be applied and/or installed atop the mated cable connectors. In one example, when clamp 100 is applied and/or installed atop the mated cable connectors, arms 104(1)-(4) may collectively secure and/or press spine 102 against one or more of the mated cable connectors. Accordingly, clamp 100 may embrace and/or hug the mated connectors, thereby holding and/or squeezing them together and/or in place relative to one another. By doing so, clamp 100 may prevent and/or stop the mated cable connectors from decoupling from one another. In this way, clamp 100 may be able to ensure, or at least improve the likelihood of maintaining, electrical continuity across the mated cable connectors.

In some examples, clamp 100 may include and/or represent any type or form of physical material, structure, and/or support feature capable of fastening, clamping, and/or latch to one or more surfaces of the mated cable connectors. Clamp 100 may take and/or form any suitable shape. In one example, clamp 100 may form a U-shaped and/or claw-like structure or clasp.

In addition, clamp 100 may be of any suitable dimensions. In one example, clamp 100 may follow the general shape and/or size of the mated cable connectors. In another example, clamp 100 may encompass and/or enshroud the outer edges of the mated cable connectors.

Clamp 100 may include and/or contain any various materials. Examples of such materials include, without limitation, plastics, ceramics, polymers, metals, rubbers, composites, combinations or variations of one or more of the same, and/or any other suitable materials.

In some examples, clamp 100 may impart and/or provide structural support, tension, and/or integrity to the mated cable connectors. In one example, the application and/or installation of clamp 100 to and/or atop the mated cable connectors may serve to lock and/or secure the top connector to the bottom connector.

Figure 2:
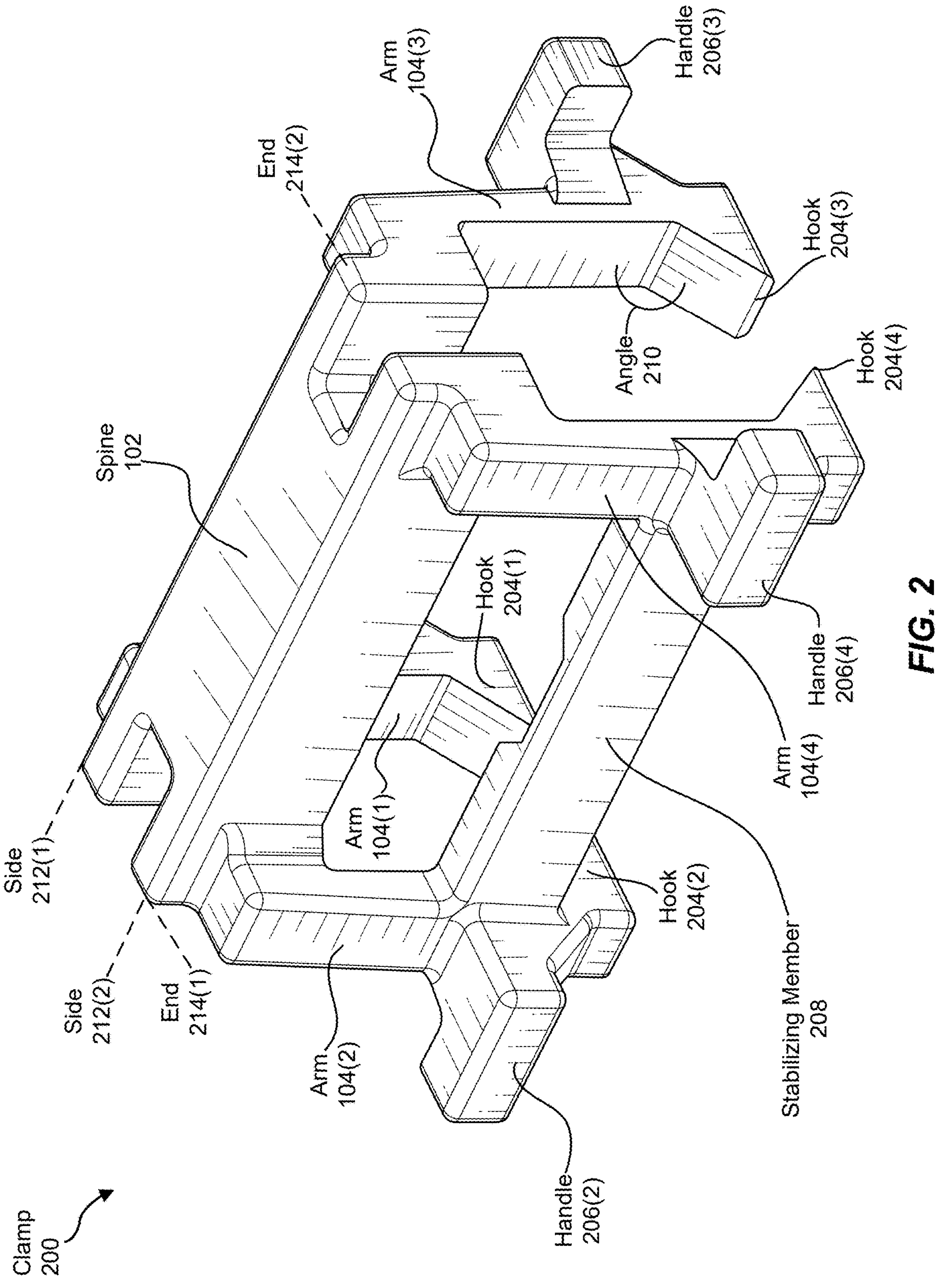
FIG. 2 is an illustration of an exemplary clamp capable of securing male and female connectors together in accordance with one or more embodiments of this disclosure.

FIG. 2 illustrates an exemplary clamp 200 capable of securing male and female connectors together without positive locks. In some examples, clamp 200 may include and/or represent certain components, configurations, and/or features that perform and/or provide functionalities that are similar and/or identical to those described above in connection with FIG. 1. In one example, clamp 200 may include and/or represent arms 104(1)-(4) that extend and/or project downward from spine 102.

In some examples, arms 104(1)-(4) may each include, represent, and/or form a hook configured and/or arranged to latch or fasten to a chamfer formed on a board-side connector. For example, arms 104(1)-(4) may include, represent, and/or form hooks 204(1), 204(2), 204(3), and/or 204(4), respectively. In this example, hooks 204(1)-(4) may latch and/or fasten to chamfers positioned on opposing sides of the board-side connector.

In some examples, hooks 204(1)-(4) may each form and/or produce an angle relative to arms 104(1)-(4), respectively. For example, hook 204(3) may form and/or produce an angle 210 relative to arm 104(3). In this example, angle 210 may inversely correspond to and/or be inversely commensurate with an angle formed and/or produced by the chamfer positioned on that side of the board-side connector. For example, angle 210 may be substantially and/or approximately equivalent to a difference between one hundred and eighty degrees and the angle formed and/or produced by the chamfer. As a specific example, if the angle formed and/or produced by the chamfer measures approximately forty-five degrees, then angle 210 may measure approximately one hundred and thirty-five degrees between hook 204(3) and arm 104(3).

In some examples, arms 104(1)-(4) may each include, represent, and/or form a handle that extends and/or projects outward and/or laterally. For example, arms 104(1)-(4) may include, represent, and/or form handles 206(1), 206(2), 206(3), and/or 206(4), respectively. In this example, handles 206(1)-(4) may extend and/or project outward and/or laterally (e.g., parallel to spine 102) from arms 104(1)-(4).

In some examples, handles 206(1)-(4) may support and/or facilitate bending arms 104(1)-(4), respectively, away from the board-side connector when pressure is applied (e.g., by a technician and/or assembler). In one example, handles 206(1)-(4) may be configured and/or arranged to open arms 104(1)-(4), respectively, to facilitate and/or support removing clamp 200 and/or spine 102.

In some examples, some of arms 104(1)-(4) may be positioned and/or located on opposite sides of spine 102. For example, arms 104(1) and 104(3) may be positioned to extend and/or project downward from a side 214(1) of spine 102. In this example, arms 104(2) and 104(4) may be positioned to extend and/or project downward from a side 214(2) of spine 102.

In some examples, some of arms 104(1)-(4) may be positioned and/or located at opposite ends of spine 102. For example, arms 104(1)-(2) may be positioned to extend and/or project downward from an end 214(1) of spine 102. In this example, arms 104(3)-(4) may be positioned to extend and/or project downward from an end 214(2) of spine 102.

In some examples, clamp 200 may include and/or represent one or more stabilizing members and/or bars that extend and/or span between certain arms. For example, a stabilizing member 208 may extend and/or span between arms 104(2) and 104(4) of clamp 200. In this example, stabilizing member 208 may impart and/or provide structural support, tension, and/or integrity to clamp 200 and/or arms 104(2) and 104(4).

Figure 3:
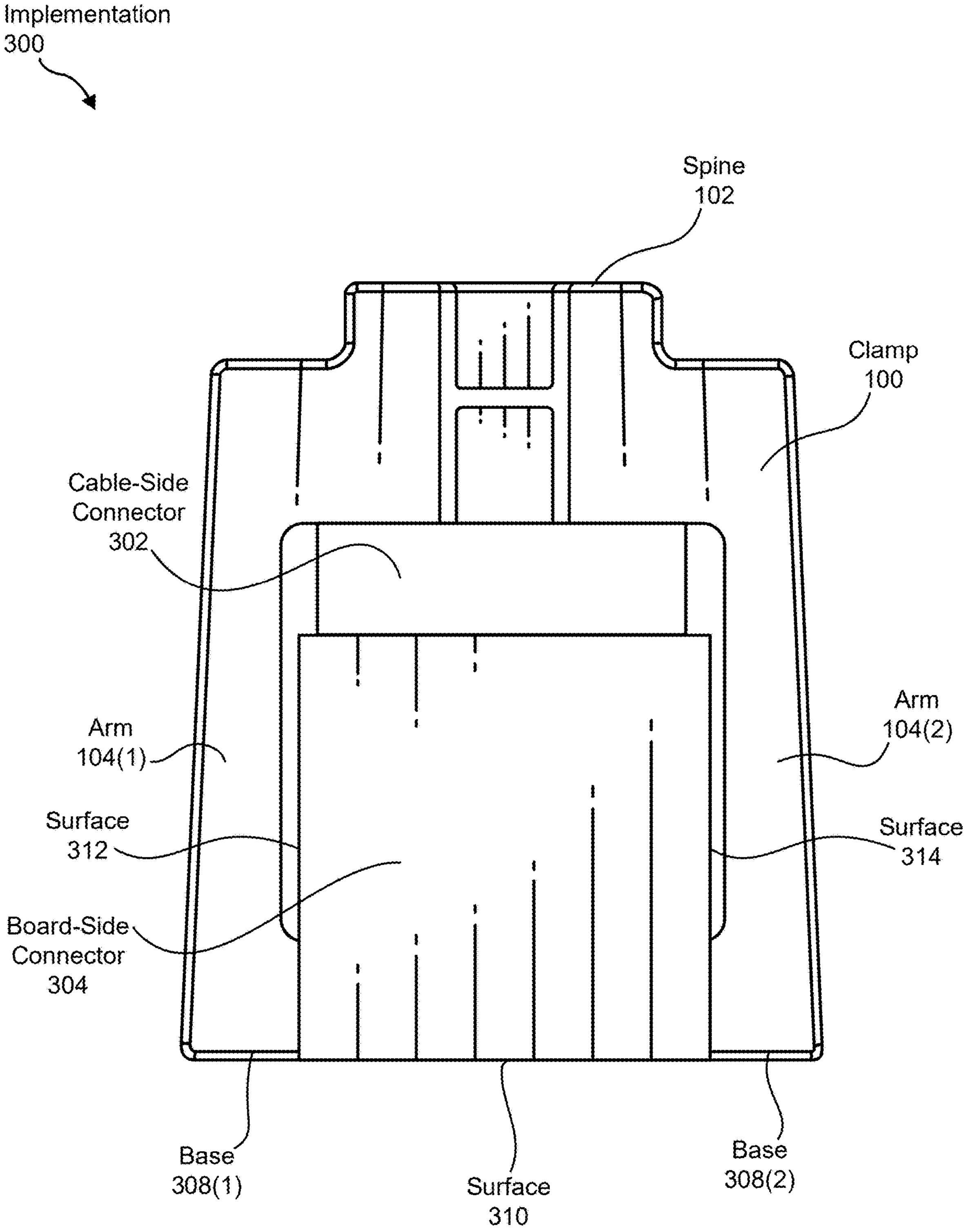
FIG. 3 is an illustration of an exemplary implementation of a clamp capable of securing male and female connectors together in accordance with one or more embodiments of this disclosure.

FIG. 3 illustrates an exemplary implementation 300 of clamp 100, which is applied to and/or atop a cable-side connector 302 inserted and/or installed into a board-side connector 304. In some examples, implementation 300 may include and/or represent certain components, configurations, and/or features that perform and/or provide functionalities that are similar and/or identical to those described above in connection with either FIG. 1 or FIG. 2. In one example, clamp 100 may be separate and/or independent of cable-side connector 302 and/or board-side connector 304.

In one example, cable-side connector 302 may physically and/or electrically coupled to an electrical cable (e.g., a ribbon and/or flat cable). Additionally or alternatively, board-side connector 304 may be physically and/or electrically coupled to a circuit board (e.g., printed circuit board). Much, if not all, of cable-side connector 302 and/or board-side connector 304 may fit in and/or fill void 110 formed and/or defined by arms 104(1)-(4) of clamp 100.

In some examples, hooks 204(1)-(4) may each include and/or represent a base that braces against and/or interfaces with the circuit board. For example, hook 204(1) may include and/or represent a base 308(1) that braces against and/or interfaces with the circuit board. In this example, hook 204(2) may include and/or represent a base 308(2) that braces against and/or interfaces with the circuit board.

In some examples, board-side connector 304 may include and/or represent various surfaces. For example, board-side connector 304 may include and/or represent surfaces 310, 312, and 314. In this example, a chamfer may be formed and/or produced between surfaces 310 and 312. Additionally or alternatively, another chamfer may be formed and/or produced between surfaces 310 and 314.

In some examples, cable-side connector 302 and board-side connector 304 may form, establish, and/or produce an electrical interface across which electricity and/or signals are transferred and/or carried. In one example, board-side connector 304 may include and/or represent the female side and/or part, and cable-side connector 302 may include and/or represent the male side and/or part. In another example, board-side connector 304 may include and/or represent the male side and/or part, and cable-side connector 302 may include and/or represent the female side and/or part. Examples of cable-side connector 302 and board-side connector 304 include, without limitation, electrical headers, pin headers, male members or pins, female receptacles, cable-to-board connectors, combinations or variations of one or more of the same, and/or any other suitable type of connectors.

Figure 4:
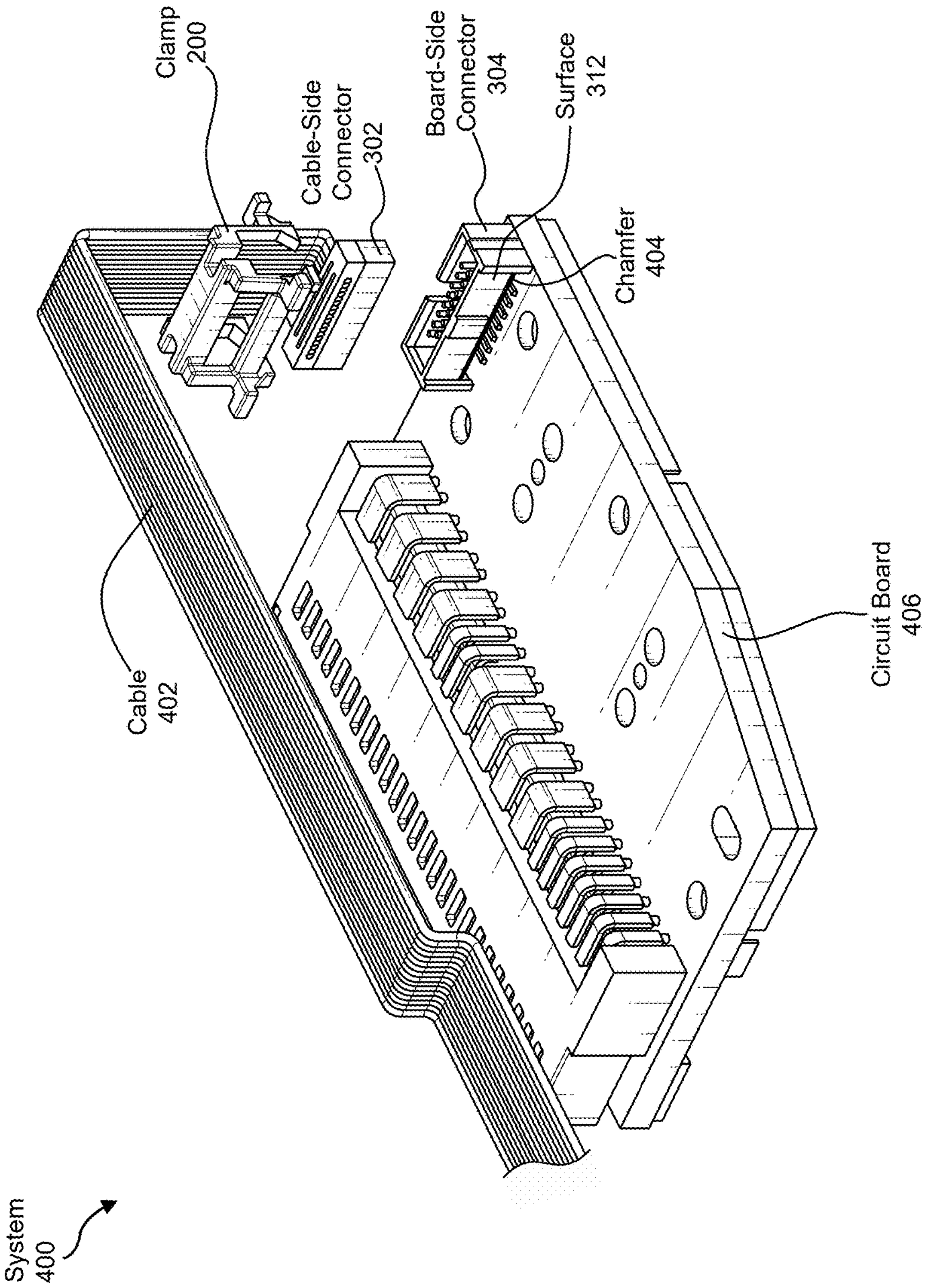
FIG. 4 is an illustration of an exemplary system that includes a clamp for securing male and female connectors together in accordance with one or more embodiments of this disclosure.
Figure 5:
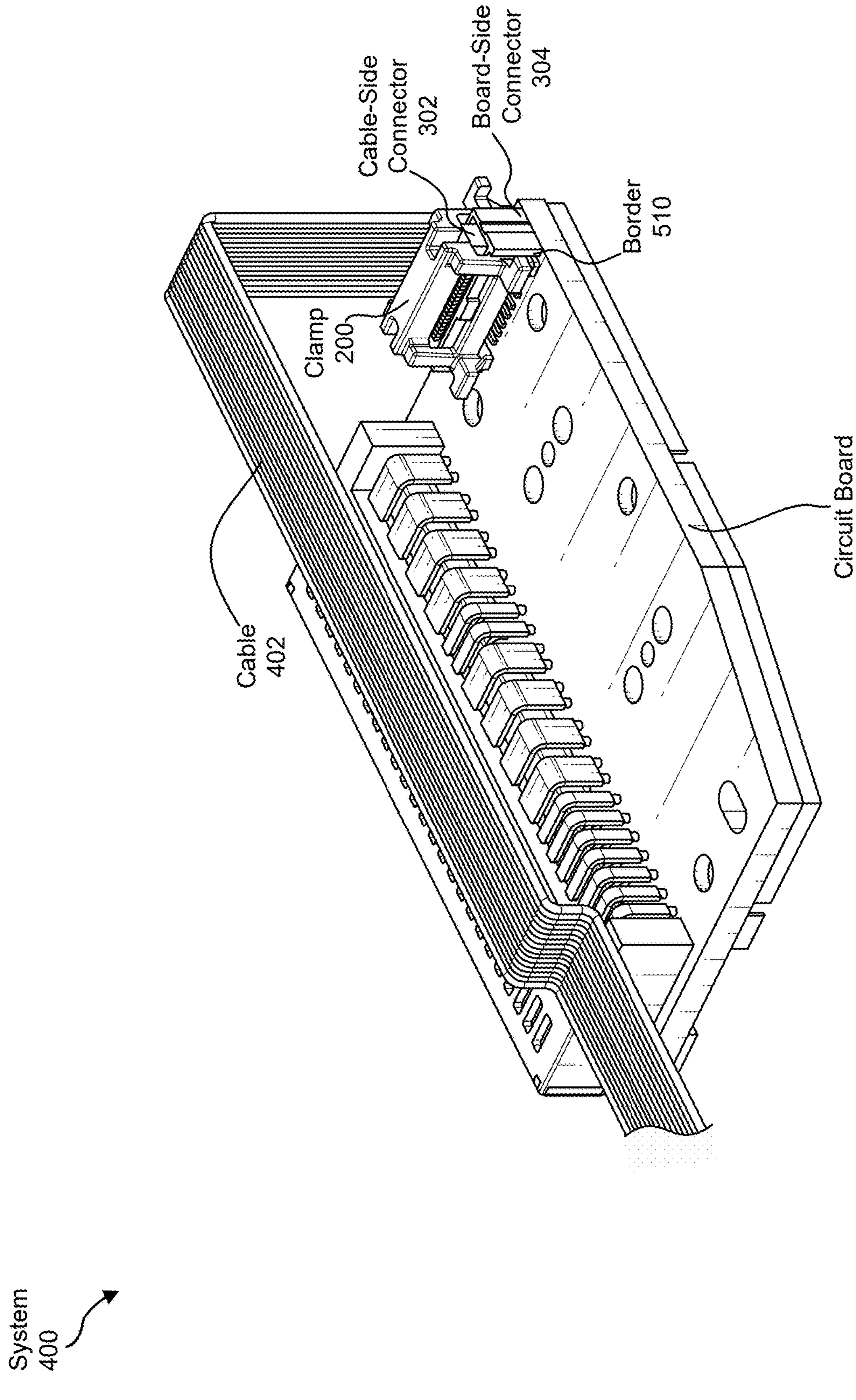
FIG. 5 is an illustration of an exemplary system that includes a clamp for securing male and female connectors together in accordance with one or more embodiments of this disclosure.
Figure 6:
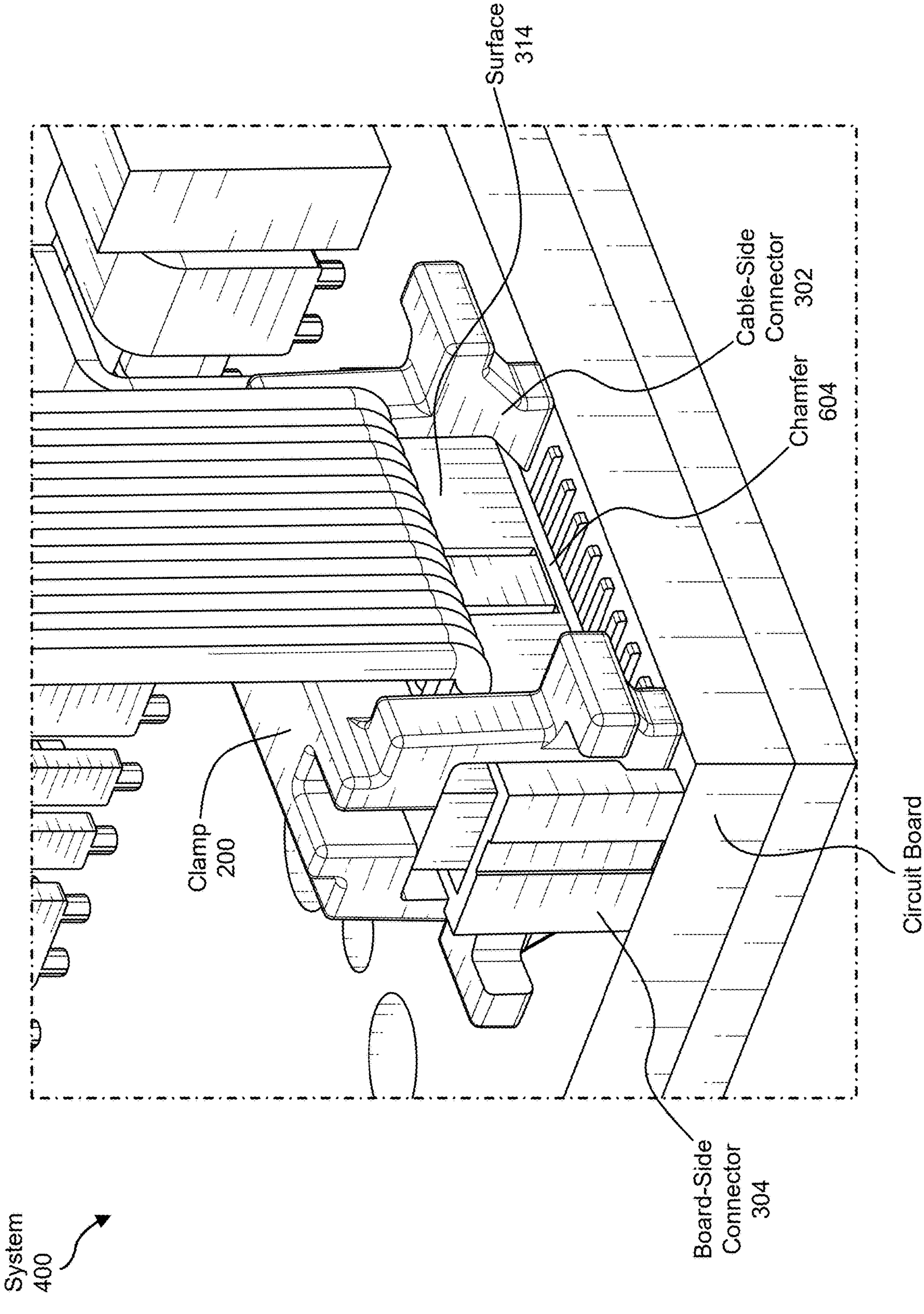
FIG. 6 is an illustration of an exemplary system that includes a clamp for securing male and female connectors together in accordance with one or more embodiments of this disclosure.

FIGS. 4-6 illustrate different views of an exemplary system 400 for securing male and female connectors together without positive locks. In some examples, system 400 may include and/or represent certain components, configurations, and/or features that perform and/or provide functionalities that are similar and/or identical to those described above in connection with any of FIGS. 1-3. In one example, system 400 may include and/or represent clamp 200, cable-side connector 302, board-side connector 304, a circuit board 406, and/or a cable 402. In this example, cable-side connector 302 may be physically and/or electrically coupled to cable 402, and board-side connector 304 may be physically and/or electrically coupled to circuit board 406.

In some examples, and as illustrated in FIGS. 5 and 6, cable-side connector 302 may be inserted and/or installed into board-side connector 304. Once cable-side connector 302 is inserted and/or installed into board-side connector 304, clamp 200 may be installed and/or applied on or atop cable-side connector 302 and/or board-side connector 304. In one example, clamp 200 may prevent cable-side connector 302 from decoupling from board-side connector 304. In other words, clamp 200 may serve and/or function to lock and/or secure cable-side connector 302 into board-side connector 304.

In some examples, and as illustrated in FIG. 4, board-side connector 304 may include and/or form a chamfer 404 between surfaces 310 and 312. Additionally or alternatively, and as illustrated in FIG. 6, board-side connector 304 may include and/or form a chamfer 604 between surfaces 310 and 314. In one example, hooks 204(1) and 204(3) may fasten, clamp, and/or latch onto chamfer 604, and hooks 204(2) and 204(4) may fasten, clamp, and/or latch onto chamfer 404. In this example, hooks 204(1)-(4) and corresponding arms 104(1)-(4) may collectively hold, lock, and/or secure spine 102 in place against cable-side connector 302 and/or board-side connector 304.

As a result, clamp 200 may effectively prevent cable-side connector 302 from decoupling from board-side connector 304. In one example, hook 204(4) may be positioned to make contact with circuit board 406, chamfer 404, and a border 510 of board-side connector 304 simultaneously. In this example, although not necessarily labelled in this way in FIGS. 4-6, hooks 204(1)-(3) may also be positioned to make contact with circuit board 406, chamfer 404 or 604, and/or border 510 or another border of board-side connector 304 simultaneously.

In some examples, the length of spine 102 and/or clamp 200 may measure substantially equivalent to the length of cable-side connector 302. Additionally or alternatively, the length of spine 102 and/or clamp 200 may measure substantially equivalent to the length of board-side connector 304.

In some examples, the various devices and systems described in connection with FIGS. 1-6 may include and/or represent one or more circuits, components, and/or features that are not necessarily illustrated and/or labeled in FIGS. 1-6. For example, the devices illustrated in FIGS. 1-6 may also include and/or represent analog and/or digital circuitry, onboard logic, transistors, transmitters, receivers, transceivers, antennas, resistors, capacitors, diodes, inductors, switches, registers, flipflops, connections, traces, buses, semiconductor (e.g., silicon) devices and/or structures, processing devices, storage devices, circuit boards, sensors, packages, substrates, housings, combinations or variations of one or more of the same, and/or any other suitable components that facilitate and/or support securing male and female connectors together without positive locks. In certain implementations, one or more of these additional circuits, components, and/or features may be inserted and/or applied between any of the existing circuits, components, and/or features illustrated in FIGS. 1-6 consistent with the aims and/or objectives described herein. Accordingly, the couplings and/or connections described with reference to FIGS. 1-6 may be direct connections with no intermediate components, devices, and/or nodes or indirect connections with one or more intermediate components, devices, and/or nodes.

Figure 7:
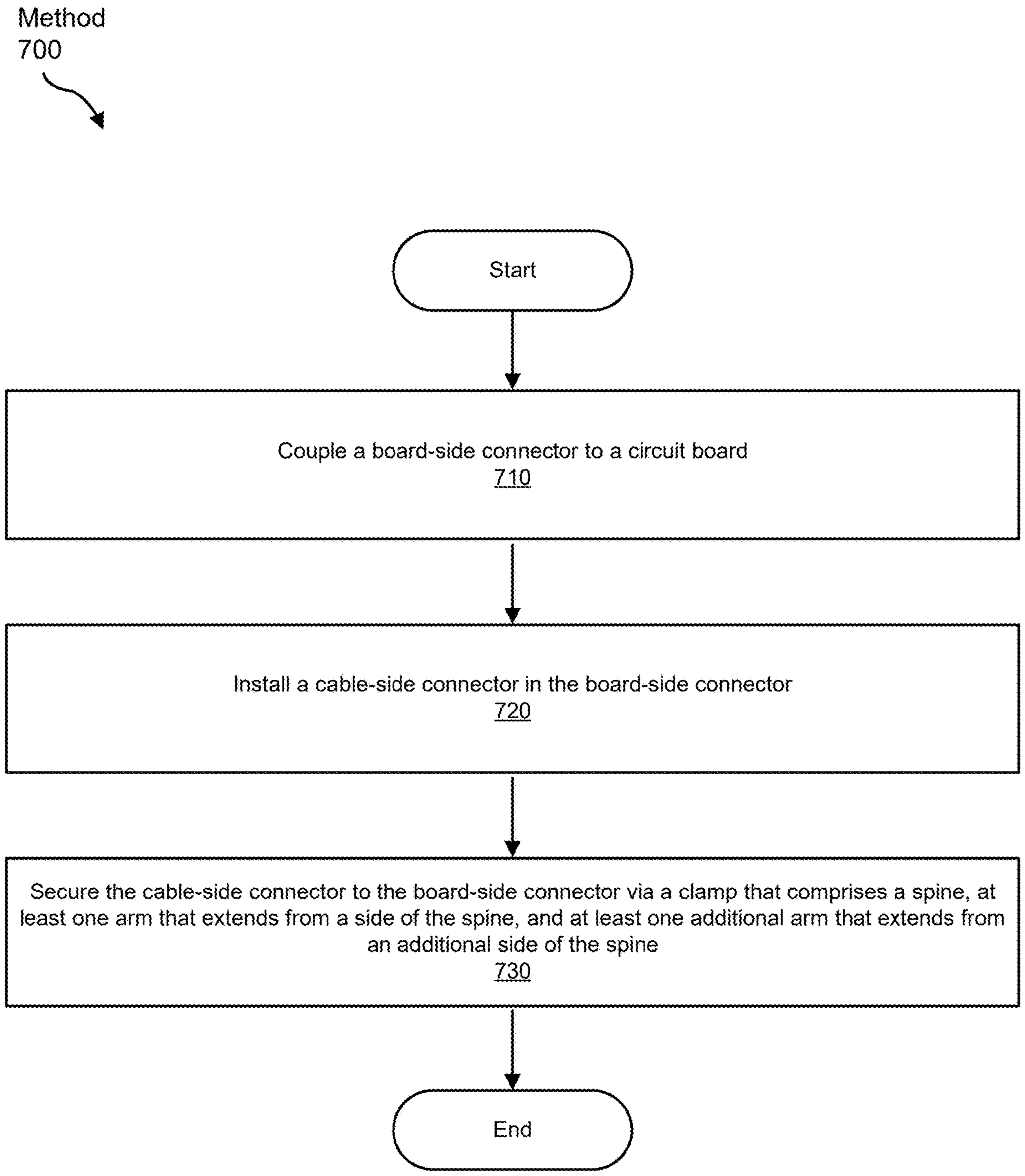
FIG. 7 is a flow diagram of an exemplary method for assembling, configuring, and/or manufacturing a computing device that implements and/or incorporates a clamp for securing male and female connectors together in accordance with one or more embodiments of this disclosure.

FIG. 7 is a flow diagram of an exemplary method 700 for manufacturing and/or assembling a system and/or equipment capable of securing male and female connectors together without positive locks. In one example, the steps shown in FIG. 7 may be achieved and/or accomplished by a computing equipment manufacturer or subcontractor that creates and/or produces computing devices and/or circuit boards. Additionally or alternatively, the steps shown in FIG. 7 may incorporate and/or involve certain sub-steps and/or variations consistent with the descriptions provided above in connection with FIGS. 1-6.

As illustrated in FIG. 7, method 700 may include the step of coupling a board-side connector to a circuit board (710). Step 710 may be performed in a variety of ways, including any of those described above in connection with FIGS. 1-6. For example, a computing equipment manufacturer or subcontractor may couple, attach, and/or fasten a board-side connector to a circuit board.

Method 700 may also include the step of installing a cable-side connector in the board-side connector (720). Step 720 may be performed in a variety of ways, including any of those described above in connection with FIGS. 1-6. For example, the computing equipment manufacturer or subcontractor may insert and/or install a cable-side connector in the board-side connector. In this example, by doing so, the computing equipment manufacturer and/or subcontractor may establish and/or form an electrical and/or communication coupling and/or bridge across the cable-side and board-side connectors.

Method 700 may also include the step of securing the cable-side connector to the board-side connector via a clamp that comprises a spine, at least one arm that extends from a side of the spine, and at least one additional arm that extends from an additional side of the spine (730). Step 730 may be performed in a variety of ways, including any of those described above in connection with FIGS. 1-6. For example, the computing equipment manufacturer or subcontractor may secure and/or lock the cable-side connector to the board-side connector via a clamp that comprises a spine, at least one arm that extends from a side of the spine, and at least one additional arm that extends from an additional side of the spine. In this example, by doing so, the computing equipment manufacturer and/or subcontractor may be able to ensure that the cable-side connector remains electrically coupled to the board-side connector.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of designs and/or configurations. In addition, any disclosure of components contained within other components should be considered exemplary in nature since many other architectures can be implemented to achieve the same functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and/or scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A clamp comprising:
a spine;
at least one arm that extends from a side of the spine; and
at least one additional arm that extends from an additional side of the spine, wherein:
the arm and the additional arm are configured to:
collectively secure the spine against a cable-side connector mated to a board-side connector to prevent the cable-side connector from decoupling from the board-side connector; and
collectively form a void dimensioned to accommodate the cable-side connector and the board-side connector; and
the clamp is configured to be installed atop the cable-side connector mated to the board-side connector such that the clamp embraces the cable-side connector mated to the board-side connector.

2. The clamp of claim 1, wherein:
the board-side connector comprises:
at least two surfaces; and
at least one chamfer formed between the two surfaces; and
the arm or the additional arm comprises at least one hook configured to latch on the chamfer.

3. The clamp of claim 2, wherein:
the chamfer forms a certain angle relative to one of the two surfaces; and
the hook forms an additional angle relative to the arm, wherein the additional angle is substantially equivalent to a difference between one hundred and eighty degrees and the certain angle.

4. The clamp of claim 2, wherein the hook comprises a base that braces against a circuit board to which the board-side connector is coupled.

5. The clamp of claim 4, wherein the hook is positioned to make contact with the circuit board, the chamfer, and a border of the board-side connector simultaneously.

6. The clamp of claim 1, wherein:

the arm comprises a handle that extends outward and is configured to facilitate bending the arm away from the board-side connector when pressure is applied; and the additional arm comprises an additional handle that extends outward and is configured to facilitate bending the additional arm away from the board-side connector when additional pressure is applied.

7. The clamp of claim 6, wherein the handle and the additional handle are further configured to open the arm and the additional arm, respectively, to facilitate removing the spine from the cable-side connector.

8. The clamp of claim 1, wherein:

the arm comprises a plurality of arms that extends from the side of the spine; and the additional arm comprises a plurality of additional arms that extends from the additional side of the spine.

9. The clamp of claim 8, wherein:

the plurality of arms are positioned at opposite ends of the spine relative to one another; and the plurality of additional arms are positioned at the opposite ends of the spine relative to one another.

10. The clamp of claim 8, further comprising a stabilizing member that extends between the plurality of arms.

11. The clamp of claim 1, wherein the spine has a length that measures substantially equivalent to a length of the cable-side connector.

12. A system comprising:

a board-side connector coupled to a circuit board;

a cable-side connector mated to the board-side connector; and a clamp that prevents the cable-side connector from decoupling from the board-side connector, the clamp comprising:

a spine;

at least one arm that extends from a side of the spine; and at least one additional arm that extends from an additional side of the spine, wherein:

the arm and the additional arm are configured to:

collectively secure the spine against the cable-side connector; and collectively form a void dimensioned to accommodate the cable-side connector and the board-side connector; and the clamp is configured to be installed atop the cable-side connector mated to the board-side connector such that the clamp embraces the cable-side connector mated to the board-side connector.

13. The system of claim 12, wherein:

the board-side connector comprises:

at least two surfaces; and at least one chamfer formed between the two surfaces; and the arm or the additional arm comprises at least one hook configured to latch on the chamfer.

14. The system of claim 13, wherein:

the chamfer forms a certain angle relative to one of the two surfaces; and the hook forms an additional angle relative to the arm, wherein the additional angle is substantially equivalent to a difference between one hundred and eighty degrees and the certain angle.

15. The system of claim 13, wherein the hook comprises a base that braces against the circuit board to which the board-side connector is coupled.

16. The system of claim 15, wherein the hook is positioned to make contact with the circuit board, the chamfer, and a border of the board-side connector simultaneously.

17. The system of claim 12, wherein:

the arm comprises a handle that extends outward and is configured to facilitate bending the arm away from the board-side connector when pressure is applied; and the additional arm comprises an additional handle that extends outward and is configured to facilitate bending the additional arm away from the board-side connector when additional pressure is applied.

18. The system of claim 17, wherein the handle and the additional handle are further configured to open the arm and the additional arm, respectively, to facilitate removing the spine from the cable-side connector.

19. A method comprising:

coupling a board-side connector to a circuit board;

mating a cable-side connector to the board-side connector; and installing a clamp atop the cable-side connector mated to the board-side connector, wherein the clamp:

comprises a spine, at least one arm that extends from a side of the spine, and at least one additional arm that extends from an additional side of the spine; and embraces the cable-side connector mated to the board-side connector.

* * * * *